United States Patent [19]

Weber et al.

[11] Patent Number: 4,771,618

[45] Date of Patent: Sep. 20, 1988

[54] MOTOR-VEHICLE STEERING-WHEEL LOCK

[75] Inventors: Günter Weber; Detlef Gräser, both of Wuppertal, Fed. Rep. of Germany

[73] Assignee: Neiman S. A., Courbevoie, France

[21] Appl. No.: 916,811

[22] Filed: Oct. 8, 1986

[30] Foreign Application Priority Data

Oct. 9, 1985 [DE] Fed. Rep. of Germany ....... 3535945

[51] Int. Cl.$^4$ .............................................. B60R 25/02
[52] U.S. Cl. ......................................... 70/185; 70/182; 70/252
[58] Field of Search ........................... 70/252, 182–189

[56] References Cited

U.S. PATENT DOCUMENTS

| 533,680 | 2/1895 | Sullivan et al. | 70/185 |
|---|---|---|---|
| 620,221 | 2/1899 | Breeze | 70/185 X |
| 797,818 | 8/1905 | McCreary | 70/183 |
| 1,137,742 | 5/1915 | Coyner | 70/185 |
| 1,318,913 | 10/1919 | Pickel | 70/183 X |
| 1,324,457 | 12/1919 | McGiff et al. | 70/183 |
| 1,498,940 | 6/1924 | Wheeler | 70/185 |
| 2,874,562 | 2/1959 | Cross | 70/252 |
| 4,576,024 | 3/1986 | Weber | 70/252 |

FOREIGN PATENT DOCUMENTS

| 135763 | 4/1985 | European Pat. Off. | 70/252 |
|---|---|---|---|
| 158907 | 10/1985 | European Pat. Off. | 70/252 |
| 1474126 | 2/1967 | France | 70/252 |
| 463048 | 4/1951 | Italy | 70/185 |
| 83/04227 | 12/1983 | World Int. Prop. O. | 70/252 |

Primary Examiner—Gary L. Smith
Assistant Examiner—Suzanne L. Dino
Attorney, Agent, or Firm—Herbert Dubno; Andrew Wilford

[57] ABSTRACT

A motor-vehicle steering-column lock has a bush carried on the steering spindle and formed with a plurality of angularly equispaced axial ribs of the same thickness and having sides that define recesses each angularly twice as wide as the rib thickness. At least three elongated locking bolts lying in respective planes and sliding longitudinally independently relative to one another and generally radially with respect to the axis have generally identical and mutually parallel ends of a width substantially equal to the rib thickness. Thus in one locking position the ends of two adjacent bolts are received by one of the recesses while the end of the third of the bolts rests on an adjacent one of the ribs and in another locking position the end of a central one of the bolts rests on one of the ribs while the ends of the other two of the bolts straddle the one rib and are received in respective recesses flanking same. The bolts are displaced the bolts parallel to their planes and radially inward such that in any relative angular position of the bolts and the column at least one of the bolts enters into one of the recesses and one other of the bolts radially engages one of the ribs and is held thereby out of any of the recesses for retaining the column in an angularly blocked position.

5 Claims, 3 Drawing Sheets

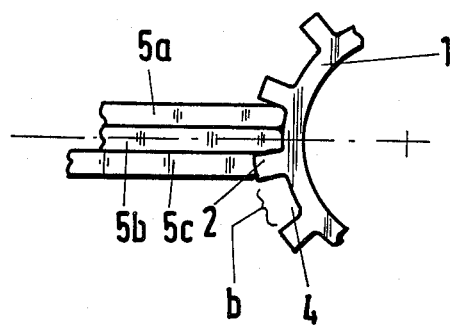
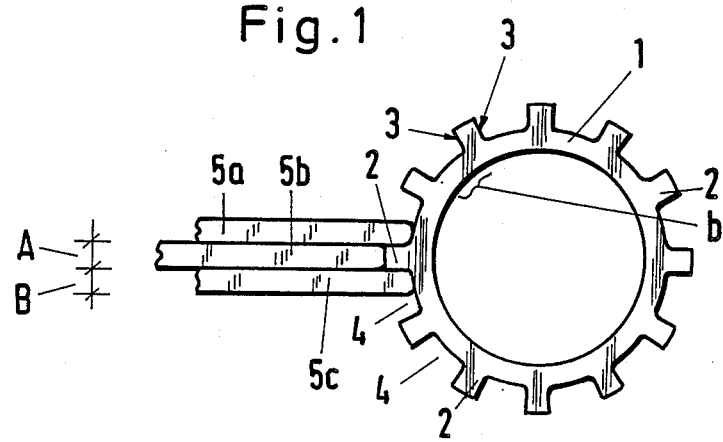

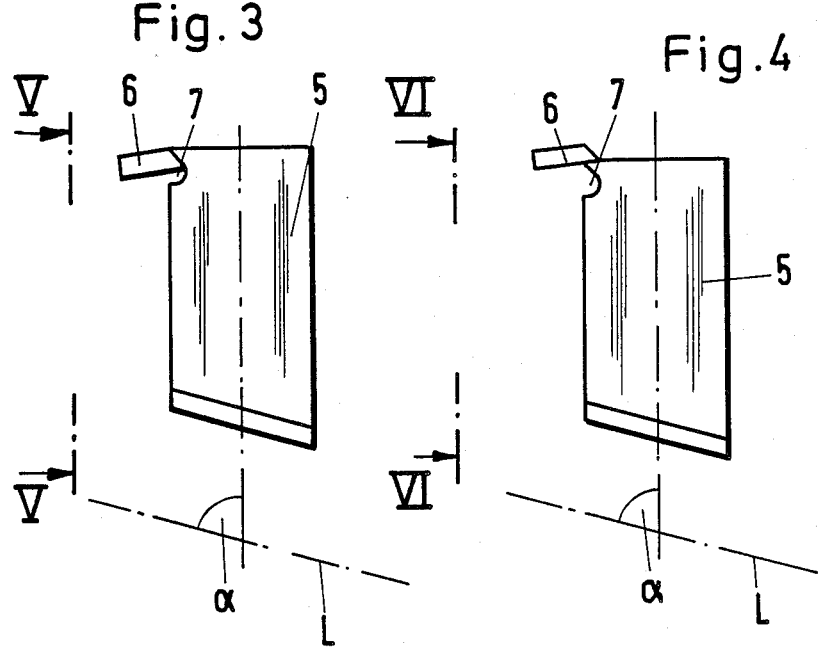

MOTOR-VEHICLE STEERING-WHEEL LOCK

FIELD OF THE INVENTION

The invention concerns a device for locking the rotational motion of a motor vehicle steering spindle having locking bolts actuated by a lock, which locking bolts, in the locking position, are located in regular recesses in the steering spindle, the steering spindle having protrusions located between the recesses and forming the locking side surfaces for the locking bolts, bolts in the locking region having a distance between them which is at least the width of a protrusion.

BACKGROUND OF THE INVENTION

A corresponding device is known from German Pat. No. 3,213,719. This known device ensures that at least one locking bolt is located in a recess of the steering spindle at each angular position of the steering spindle so that locking of the rotational motion occurs in each position of the steering spindle. In this device, it is already known to use more than two locking bolts. With this known device, one can differentiate between positions in which one locking bolt has moved in so as to lock and the other is still in contact on a protrusion so that, after a small rotational movement of the steering spindle, it engages in a position in which both locking bolts have moved in so as to lock and therefore no longer permit any rotational motion of the steering spindle. It has been found that there is a requirement to provide for the latter absolute locking position as often as possible over the periphery of the steering spindle in order to increase security.

OBJECTS OF THE INVENTION

It is the object of the invention to improve a device of the aforementioned so as to increase the number of positions of the steering spindle in which the locking bolts block the steering spindle in such a way that a rotational motion is no longer possible.

SUMMARY OF THE INVENTION

This objective is achieved by the invention in that a third locking bolt is located in the gap provided between two locking bolts and having the width of a protrusion.

More particularly the steering-column lock of this invention has a bush carried on the steering spindle and formed with a plurality of angularly equispaced axial ribs of the same thickness and having sides that define recesses each angularly twice as wide as the rib thickness. At least three elongated locking bolts lying in respective planes and sliding longitudinally independently relative to one another and generally radially with respect to the axis have generally identical and mutually parallel ends of a width substantially equal to the rib thickness. Thus in one locking position the ends of two adjacent bolts are received by one of the recesses while the end of the third of the bolts rests on an adjacent one of the ribs and in another locking position the end of a central one of the bolts rests on one of the ribs while the ends of the other two of the bolts straddle the one rib and are received in respective recesses flanking same. The bolts are displaced the bolts parallel to their planes and radially inward such that in any relative angular position of the bolts and the column at least one of the bolts enters into one of the recesses and one other of the bolts radially engages one of the ribs and is held thereby out of any of the recesses for retaining the column in an angularly blocked position.

In such a device, it is sufficient for two of the three or more locking bolts to drop into a recess of the steering spindle or of a bush located on the steering spindle in order to prevent the steering spindle from executing any rotational motion even over a few degrees of angle. By this means, the number of rotational positions of the steering spindle at which complete blocking takes place is substantially increased for the same number of steering spindle recesses. In addition, such a device has substantially smaller installation dimensions in the axial and radial directions.

It is particularly advantageous for the third locking bolt to extend radially relative to the steering spindle. Very small installation dimensions can then be achieved if the locking bolts are parallel to one another. Self-locking in all positions is achieved if all the locking bolts extend radially relative to the steering spindle.

Simplification in manufacture and small installation dimensions are achieved if all the locking bolts each have that same width, at least in the regions which can be located in the recesses, as that corresponding to the width of the protrusion. In addition, the total width of two adjacent locking bolts should be equal to the width of a recess. In order to achieve absolute locking of the steering spindle, it is proposed that, in the locking position always, two locking bolts should be located in the same recess or in two neighboring recesses and the third locking bolt should be in non-locking contact with a protrusion.

An increase in security is achieved if more than three locking bolts are located adjacent to one another. Self-locking and increased security, particularly in the case of locking bolts located parallel to one another is achieved if the locking bolts can be fixed in the locking position, in particular by a transverse plate. The locking part can then be controlled by a cam which can be moved by the steering column lock.

BRIEF DESCRIPTION OF THE DRAWING

In the drawing:

FIG. 1 shows a cross-section through a bush which can be fastened to a steering spindle and which has recesses located at regular distances around the periphery, two locking bolts being located in different recesses and a locking bolt located between them being seated on a protrusion, FIG. 2 shows a detail of FIG. 1 with two locking bolts in one recess and a locking bolt beside them and sitting on a protrusion, FIG. 3 shows a side view of a locking bolt in a non-locking position, FIG. 4 shows a side view of a locking bolt in a locking position, FIG. 5 shows a view along line V—V in FIG. 3 and FIG. 6 shows a view along line VI—VI in FIG. 4.

SPECIFIC DESCRIPTION

Figure 7:
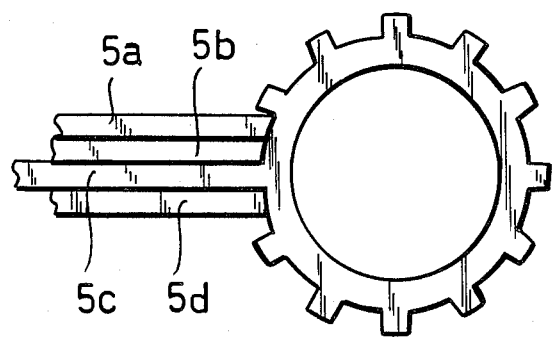
FIG. 7 shows an alternate embodiment using four bolts.
Figure 8:
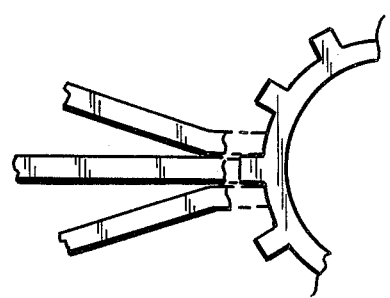
FIG. 8 shows an alternate embodiment wherein the bolts are not all parallel, but rather, radially disposed.

On a tubular steering spindle (not shown) of a motor vehicle, a co-axial bush 1 is externally welded so that it is rotationally fixed, this co-axial bush carrying axial rib-shaped protrusions 2 at regular distances apart over its cylindrical periphery. Each rib-shaped protrusion 2 has two radial side surfaces 3 which simultaneously form the side surfaces of recesses 4 located between the protrusions.

Three plate-shaped locking bolts 5a–5c are fastened so that they can be slid longitudinally parallel to one another alongside the bush 1, the side surfaces of the plate-shaped locking bolts being parallel to the axis of the steering spindle and the central locking bolt 5b being located radially. The locking bolts, at least in the regions which can be located in the recesses 4, have a width or thickness B which is equal to half the width b of the recess in the peripheral direction. In addition, the width B is equal to the width of the protrusions 2, i.e. equal to the gaps between the side surfaces 3 in the region of a protrusion.

In the locking position, one of the three locking bolts is always located on the end surface of a protrusion 2 and the other two locking bolts are located in a recess 4. In the position shown in FIG. 1, the central locking bolt 5b is in non-locking contact on a protrusion 2 and the two other locking bolts are located in two neighboring recesses 4. In the locking position shown in FIG. 2, on the other hand, two adjacent locking bolts 5a and 5b are located within the same recess 4 and the third locking bolt 5c, located to one side, is located on a protrusion 2. It is only over a few degrees of angle that steering spindle positions occur in which these two locking positions are not achieved but even in those cases, at least one locking bolt falls into a recess 4 so that there is no non-locking position.

In the exemplary embodiment, the locking bolts are located parallel to one another. As an alternative, however, all three locking bolts can also be located with their central planes radial to the steering spindle. Furthermore, more than three locking bolts can be located adjacent to one another.

Particularly in the case in which the locking bolts are inserted without being self-locking, a locking part 6, for example a transverse plate, or several locking parts can be provided to hold the locking bolt in the locking position, see FIGS. 4 and 6. For this purpose, the locking part 6 is in contact with the rear side of the locking bolts 5a, 5b, 5c. In order to hold the locking bolts in the non-locking position (inter alia in the locking readiness position), the locking part 6 engages in a lateral recess 7 of the locking bolt, FIGS. 3 and 5.

This locking part 6 can be controlled by a cam (not shown) which can be moved from the steering column lock. This cam can be fastened to an extension of the cylindrical core. In addition, the locking bolts 5a, 5b, 5c can be arranged to be lever-shaped or pin-shaped, instead of being plate-shaped. It is also clear from FIGS. 3 to 6 that, although the locking bolts can be located in a radial plane or one parallel to it, their longitudinal direction and their direction of motion runs at an angle α oblique to the axis L of the steering column.

We claim:
1. A locking device for a steering column, the device comprising:
   a steering spindle forming part of a steering column and rotating about an axis;
   a cylindrical bush coaxial with and fixed to said spindle;
   a plurality of angularly equispaced axial ribs of the same thickness formed on said bush and each having two radial side surfaces angularly spaced by the rib thickness, said ribs forming between themselves respective recesses each angularly flanked by a pair of said radial surfaces of two adjacent ribs and each having an angular width between the flanking surfaces which is at least twice said rib thickness;
   at least three elongated locking bolts lying in respective planes and sliding longitudinally independently relative to one another and generally radially with respect to said axis, said bolts having generally identical and mutually parallel ends of a width substantially equal to said rib thickness such that each pair of two adjacent ends of said bolts has a combined width substantially equal to said width of said recesses so that in one locking position the ends of two adjacent bolts are received by one of said recesses while the end of the third of said bolts rests on an adjacent one of said ribs and in another locking position the end of a central one of said bolts rests on one of said ribs while the ends of the other two of said bolts straddle said one rib and are received in respective recesses flanking same; and
   means for displacing said bolts parallel to their planes and radially inward such that in any relative angular position of said bolts and said column at least one of the bolts enters into one of said recesses and one other of said bolts radially engages one of the ribs and is held thereby out of any of the recesses for retaining said column in an angularly blocked position.

2. The locking device defined in claim 1 wherein said planes are parallel to each other.

3. The locking device defined in claim 1, wherein locking bolts extend radially to said spindle.

4. The locking device defined in claim 1, further comprising at least one locking part fixing another end of one of said bolts in said blocking position.

5. The locking device defined in claim 3 wherein said locking part holds said other end in a nonlocking position.

* * * * *